C. R. HERMAN.
SCALE.
APPLICATION FILED NOV. 10, 1920. RENEWED JAN. 19, 1922.
1,411,495. Patented Apr. 4, 1922.
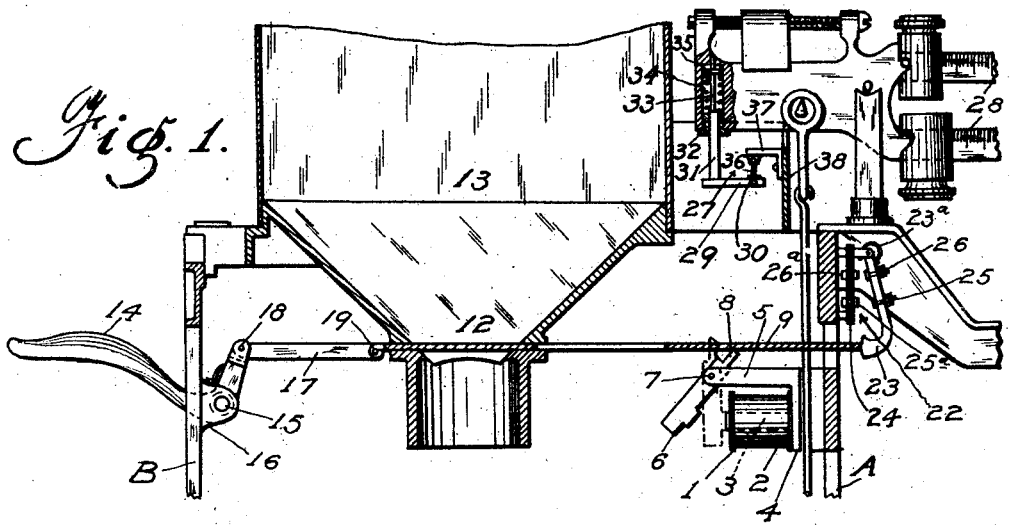
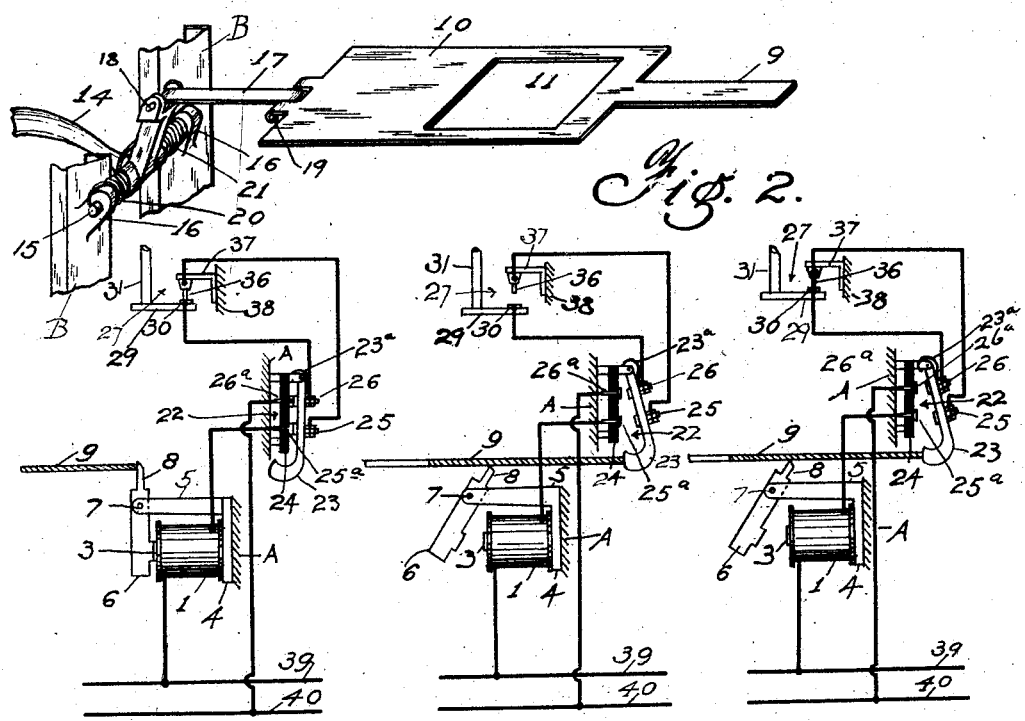
INVENTOR.
CARL R. HERMAN

UNITED STATES PATENT OFFICE.

CARL REINHOLD HERMAN, OF CRAFTON, PENNSYLVANIA, ASSIGNOR TO THE MORRIS AUTOMATIC SCALE COMPANY, OF CRAFTON, PENNSYLVANIA, A CORPORATION OF SOUTH DAKOTA.

SCALE.

1,411,495. Specification of Letters Patent. Patented Apr. 4, 1922.

Application filed November 10, 1920, Serial No. 423,066. Renewed January 19, 1922. Serial No. 530,495.

*To all whom it may concern:*

Be it known that I, CARL R. HERMAN, a citizen of the United States, residing at Crafton, in the county of Allegheny and State of Pennsylvania, have invented certain new and useful Improvements in Scales, of which the following is a specification, reference being had therein to the accompanying drawings.

This invention relates to new and useful improvements in weighing scales and more particularly to automatic control devices for platform scales provided with a storage or supply hopper.

The primary object of this invention is to provide an electrically operated device of this character which will automatically shut off the discharge of any free flowing commodity derived from a supply hopper after a predetermined weight of said commodity has been weighed.

Another object of this invention is to provide an electric control device which will automatically shut off the discharge of said commodity as soon as the operating electric current is interrupted, either accidentally or intentionally.

A further object of this invention is to provide a device of this character which is of simple construction and operation and which can be manufactured at low cost.

Further objects and advantages of this device will appear from the following description, taken in connection with the accompanying drawings.

In the drawings:

Fig. 1 is a side elevation, partly shown in section, of my control device, as applied to a platform-scale, provided with a supply hopper.

Fig. 2 is a perspective view showing the sliding shutter which controls the discharge from the hopper.

Figures 3, 4, 5, are schematic representations of the conditions occurring in the electric circuit of the device, under various weighing conditions.

This invention is particularly intended to cover improvements on the United States Patent No. 1,291,707 dated January 21, 1919 and more especially on the co-pending application of even date, by Jolly Morris.

For the purpose of distinguishing the two copending applications, I call the present one the "closed circuit control device" because the electric circuit is closed while the commodity is flowing into the container, whereas in the other application, the circuit is open, during the process of filling the containers.

Referring more in details to Fig. 1, in which I have shown only the upper parts of a scale, the control device consists of an electro-magnet 1, (mounted on the scale frame A,) comprising a solenoid 2, a core 3, secured on a base 4, provided with a bracket 5 at the outer end of which is pivotally mounted the armature 6 by means of the pin connection 7. The upper, and shorter, end of this armature is provided with a catch-finger 8 of sufficient length to engage the end of the arm 9 of the shutter 10 when the latter has been drawn backward until its opening 11 registers with the discharge opening 12 provided at the lower end of the supply hopper 13. The shutter is manually operated into the open position by means of the bell-crank-lever 14 secured on a shaft 15 rotatively mounted in supports 16 secured on the scale frame B. The connection between this lever and the shutter is effected by a connecting rod 17 which hingedly connects these two members by means of the pin connections 18 and 19. Coil springs 20 and 21 are mounted on the shaft and on each side of the bell-crank-lever in such a manner that their tension will be increased when the bell-crank lever is drawn backwards into the open position of the shutter.

A two pole switch 22 is suitably mounted on the frame A and is so disposed that its handle 23, (provided with the closing spring 23ª,) will be pushed into open position by the shutter arm 9 as the latter reaches its most forward position, corresponding to the closing position of the shutter. The handle 23 and the switch base 24 are provided with insulated contacts 25, 25ª, 26 and 26ª to which the electric wires of the control circuit are connected.

A second switch 27 is mounted at the rear end of the graduated beam 28 and is operated by the movements of said beam. This switch consists of the contact plate 29 provided with a contact disc 30. The contact plate is secured to the vertical rod 31 slidably mounted within the rear end of the graduated beam and guided by the threaded bushing 32. The upper portion 33 of the guide rod is reduced in diameter to provide the necessary room for the compression spring 34 inserted between the bushing 32 and the collar 35 secured to the vertical rod.

The purpose of this spring is to insure proper contact between the stationary contact point 36, mounted on the bracket 37 positioned within the protecting casing 38, and to absorb the shocks which may occasionally occur between the contacts owing to any sudden movements of the graduated beam.

The operation of my electro-magnetic control device is as follows:

After the scale has been adjusted to weigh off a predetermined weight of a given commodity, a container is placed on the platform directly beneath the discharge opening and the shutter 10 is pulled back by means of the bell-crank lever 14, into its full open position. The spring 23ª is now able to force the switch blade into the closed position and the contact in the upper switch 27 is also closed on account of the fact that the commodity being weighed has not yet reached the predetermined weight in the container. The electric circuit therefor is closed and the electro-magnet 1 is energized, thus attracting the armature 6. The catch-finger 8 of the armature is thereby brought into engagement with the end of the shutter extension 9 and the tension in the springs 20 and 21 of the bell-crank lever 14 is counteracted by the magnetic pull of the electro-magnet on the armature.

Fig. 3 represents diagrammatically the condition existing in the control device during the discharge of the commodity. The electric current is derived from any suitable source such as storage battery or electric light circuit represented in the figure by the lines 39 and 40. As shown in Figure 3, the current will flow from the line 39, through the coil of the electro-magnet and, passing through the contacts 25, 30, and 26, will return to the line 40 of the supply circuit.

As soon as the container has reached its predetermined weight, the rear end of the graduated beam will be pulled down and the contact at the point 30 will be broken, thus interrupting the flow of electricity through the magnet coil. The de-energized magnet will therefore release the armature and the shutter will be rapidly shot forward into its closing position by the action of the tensioned springs 20 and 21, thereby striking the switch handle 23 and opening the electric circuit also at the switch 22, as shown in Fig. 4.

In Figure 5 I have shown the switch 22 open and the upper switch 27 closed. This condition corresponds to the "idle" condition of the scale, that is, when the shutter is closed and the platform is not loaded.

It is apparent from the foregoing description that the "closed circuit" magnetic control offers an additional safety feature over the "open circuit" device specified in the co-pending application, in so far that in case the electric current of the circuit should be interrupted, the shutter will close immediately and prevent any spilling or overflowing of the commodity. This would not be the case with the "open circuit" device since it requires that the electro-magnet be energized to release the shutter into the closed position.

From the foregoing description taken in connection with the accompanying drawings, the construction of the device and the method of operation will be readily apparent to those skilled in the art to which the invention appertains, and while describing the principle of operation of the invention together with the device which is now considered to be the best embodiment thereof, it is to be understood that the device shown is merely illustrated and that various changes in the form, proportion and the minor details of construction may be resorted to without departing from the principle or sacrificing any of the advantages of the invention as defined in the appended claims.

What I claim to be new is:

1. The combination with a scale embodying a fulcrumed beam of a hopper having a commodity discharge chute, a spring retracted manually opened apertured closure for the chute, a detent positioned to at times retain the closure in open position, an electro-magnet adapted when energized to retain the detent in engaging position, a circuit for the electro-magnet, means actuated by the swaying of the beam to open the circuit, and means actuated by the retraction of the closure for opening the circuit in another position.

2. The combination with a scale embodying a fulcrumed beam of a hopper having a commodity discharging chute, a spring retracted manually actuated apertured closure for the chute, a detent positioned to engage the closure when in open position, an electro-magnet adapted to maintain the detent in engaging position, a circuit for the electro-magnet, a switch introduced into the circuit and positioned to be opened by the retraction of the closure, a second switch introduced into the circuit and means actuated by the swaying of the beam to open the second switch.

3. The combination with a scale embodying a fulcrumed beam of a commodity discharge chute, a closure for the chute, manual means for moving the closure to open position, means to close the closure when released, a detent adapted to engage and maintain the closure in open position, an electromagnet adapted when energized to maintain the detent in engaging position, a circuit for the electro-magnet, two switches introduced into the circuit, means carried by the beam for opening one of said switches when the beam responds to an overbalancing condition, and means carried by the closure for opening the other switch when responding to the closing means.

4. The combination with a scale of a commodity chute, a closure for the chute, an electro-magnet adapted to maintain the closure in open position, a circuit for the electro-magnet, means actuated by the scale structure for opening the circuit to the electro-magnet, and means actuated by the closure for opening the circuit at a different point.

5. The combination with a scale embodying a fulcrumed beam of a commodity chute, a movable closure for the chute, a detent adapted to hold the closure in open position, an electro-magnet adapted when energized to maintain the detent in engaging position, a circuit for the electro-magnet, means carried by the scale beam for opening the circuit when the beam is raised, and means carried by the closure for opening the circuit when the closure is in closed position, and maintaining the circuit in such open condition while the closure remains in closed position.

In testimony whereof I hereunto affix my signature in presence of two witnesses.

CARL REINHOLD HERMAN.

Witnesses:
J. L. MORRIS,
ERNEST PAYNE.